United States Patent Office 2,998,433
Patented Aug. 29, 1961

2,998,433
2α-HALO-4,9(11),16-PREGNATRIENE-3,20-DIONES
Robert E. Schaub, Paramus, and Martin J. Weiss, Oradell, N.J., assignors to American Cyanamid Company, New York, N.Y., a corporation of Maine
No Drawing. Filed July 22, 1960, Ser. No. 44,567
3 Claims. (Cl. 260—397.3)

This invention relates to new organic compounds. More particularly, it relates to 2,21-substituted 4,9(11), 16-pregnatrienes and preparation of the same.

This application is a continuation-in-part of our application Serial No. 747,327, filed July 9, 1958, now abandoned.

The effect of cortisone and hydrocortisone in the treatment of arthritis, bursitis and related collagen diseases is well known. The undesirable side effects such as edema, hormone imbalance, etc. are equally well known. The undesirable side effects, to a large extent, have been overcome while at the same time increasing the effectiveness in compounds such as described and claimed in United States Patent 2,789,118. It is, therefore, desirable that the cheapest and most effective method be developed for the preparation of the latter compounds. We have found that the intermediates hereinafter described are useful in such a method.

The compounds of the present invention can be represented by the following general formula:

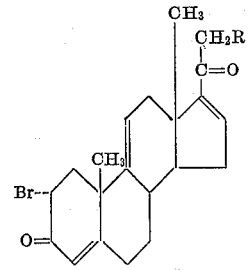

in which R is bromine or a lower alkanoyloxy radical.

The present compounds are, in general, soluble in the usual organic solvents. They are substantially insoluble in water.

The compounds of the present invention are prepared from 4,9(11),16-pregnatriene-3,20-dione which has been described in the prior art. The latter compound is reacted, for example, with ethyl oxalate in the presence of sodium methoxide to produce the sodium salt of 2,21 - bis - ethoxalyl - 4,9(11),16 - pregnatriene - 3,20-dione. This compound can be reacted with bromine to produce compound III on the flowsheet which will lead to compound V. Compound V can easily be converted into compound IX of United States Patent 2,789,118 as shown in the flowsheet. These reactions can be summarized by the following flowsheet.

FLOWSHEET

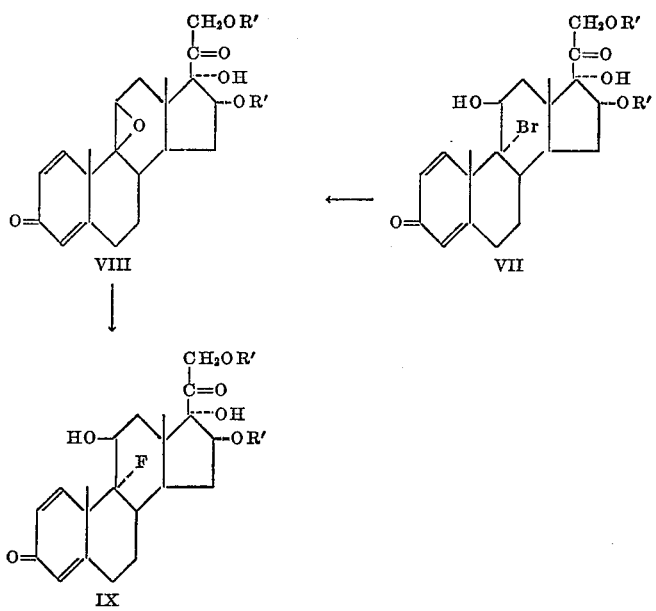

United States Patent
No. 2,789,118

In the flowsheet, R' is a lower alkanoyl radical.

The assignment of the alpha configuration to the C-2 substituted halogens is based upon an analysis of molecular rotation data, spectroscopic data and also the probable reaction mechanism and by analogy with the products obtained from other 2-alkoxalyl-3-keto steroids. This assignment is thus based on the present data of the art known to organic chemists. It will be apparent that no part of the specification will be materially effected if it should later be established that the configuration is the opposite from that deducible from data presently available to workers in the field.

The following examples are illustrative of the preparation of the compounds of the present invention.

Example I

A solution of 144 ml. of 1 N methanolic sodium methoxide (2.2 moles) and 450 ml. of anhydrous reagent benzene is freed from methanol by azeotropic distillation, the temperature of the distillate rising from 58° to 80° C. To the sludge is added 48 ml. (6 moles) of ethyl oxalate, and the resulting solution is added to a stirred solution of 20 g. of 4,9(11),16-pregnatriene-3,20-dione (I), in 400 ml. of anhydrous reagent benzene. In a few minutes the solution becomes turbid and an amorphous solid separates. The mixture, protected from moisture, is stirred for two hours, then 600 ml. of ether is added and stirring is continued for one hour. The yellow solid is filtered; 39.2 g. of sodium salt of 2,21-bis-ethoxalyl-4,9(11),16-pregnatriene-3,20-dione is obtained.

A solution of 39.2 g. of sodium salt of 2,21-bis-ethoxalyl-4,9(11),16-pregnatriene-3,20-dione in 400 ml. of water, clarified by filtration, is acidified with 1000 ml. of 5% aqueous hydrochloric acid. The precipitated amorphous solid is collected and washed well with ether; yield 29.9 g. of 2,21-bis-ethoxalyl-4,9(11),16-pregnatriene-3,20-dione (II). Ultraviolet spectrum:

$$\lambda_{max.}^{MeOH} \ 242 \ m\mu \ (16,900) \ and \ 315 \ m\mu \ (\epsilon=13,300)$$

$$\lambda_{max.}^{0.1N} \ NaOH \ 249 \ m\mu \ (\epsilon=20,200) \ and \ 339 \ m\mu \ (\epsilon=22,200)$$

$$\lambda_{max.}^{0.1N} \ HCl \ 243 \ (\epsilon=20,000) \ and \ 315 \ m\mu \ (\epsilon=10,400)$$

Example II

To a stirred solution of 32.3 g. of 2,21-bis-ethoxalyl-4,9(11),16-pregnatriene-3,20-dione (II) and 30 g. of anhydrous potassium acetate in 1300 ml. of reagent methanol cooled to 0° is added dropwise over 25 minutes 64 ml. of a carbon tetrachloride solution containing 20.3 g. of bromine. After six hours at 0° there is added 400 mg. of phenol, then 60 ml. of 1 N methanolic sodium methoxide. After being refluxed for ten minutes, the solution is concentrated to one-half volume under reduced pressure. Dilution with 1500 ml. of water causes a gum to separate which is extracted with three 300 ml. portions of chloroform. The combined extracts, washed with water and dried with magnesium sulfate, are evaporated to dryness under reduced pressure leaving 31 g. of a glass. The glass is dissolved in 200 ml. of reagent benzene and adsorbed on a silica gel column (500 g.). The product is eluted with 2500 ml. of 5% ether-benzene, and is crystallized from acetone-petroleum ether to give 11.1 g. (33%) of 2α,21-dibromo-4,9(11),16-pregnatriene-3,20-dione (III) as an acetone solvate, melting point 93–95° (gas). Recrystallization from acetone-petroleum ether gives white crystals of 2α,21-dibromo-4,9(11),16-pregnatriene-3,20-dione, melting point 99–101° (gas);

$$[\alpha]_D^{25} + 140° \ (2\% \ in \ CHCl_3)$$

ultraviolet spectrum;

$$\lambda_{max}^{MeOH} \ 242 \ (\epsilon=24,400)$$

infrared spectrum;

$$\gamma_{max.}^{KBr} \ 2340, \ 1690, \ 1630, \ 1620, \ 1590 \ cm.^{-1}$$

Example III

To a stirred solution of 4.62 g. of the bis-sodium salt of 2,21-bis-ethoxalyl-4,9(11),16-pregnatriene-3,20-dione (II) in 50 ml. of absolute methanol, cooled to 0° in an ice bath, is added dropwise a solution of 8.45 ml. of carbon tetrachloride containing 2.68 g. of bromine. Stirring is continued at 0–5° for six hours. After standing at 5° for 24 hours, there is added 100 mg. of phenol, then 7.95 ml. of 2 N methanolic sodium methoxide. The solution is refluxed on a steam bath for ten minutes then diluted with three volumes of water and extracted with three 100 ml. portions of methylene chloride. The combined extracts, washed with water and dried with magnesium sulfate, are evaporated to dryness under reduced pressure leaving 4.5 g. of a glass. The glass is dissolved in 25 ml. of reagent benzene and adsorbed on a silica gel column (130 g.). The product is eluted with one liter of 5% ether-benzene to give 1.795 g. of 2α,21-dibromo-4,9(11),16-pregnatriene-3,20-dione (III) as a glass. Crystallization from acetone-petroleum ether gives 1.07 g. (25%) of 2α,21-dibromo-4,9(11),16-pregnatriene-3,20-dione, melting point 99–102° (gas).

*Example IV*

A solution of 14.65 g. of 2α,21-dibromo-4,9(11),16-pregnatriene-3,20-dione (III) in 1100 ml. of reagent acetone is stirred for 72 hours at room temperature with a mixture (prepared in a mortar) of 73.5 g. of potassium bicarbonate and 44 ml. of glacial acetic acid. The mixture is diluted with three liters of water and extracted with three 50 ml. portions of methylene chloride. The combined extracts, washed with water and dried with magnesium sulfate, are evaporated to dryness under reduced pressure, leaving 14, g. of a glass. The glass is dissolved in 50 ml. of benzene and adsorbed on a silica gel column (400 g.). Elution with three liters of 3% ether-benzene gives 4.3 g. of crystalline material, melting point 92–95° (gas), identified as 2α,21-dibromo-4,9(11),16-pregnatriene-3,20-dione (III) by infrared and mixed melting point. The product is then eluted with three liters of 10% ether-benzene and is crystallized from ether to give 6.4 g. (51% or 73% based on unrecovered starting material) of 21-acetoxy-2α-bromo-4,9(11),16-pregnatriene-3,20-dione (IV, R′=acetyl), melting point 168–172° dec. Recrystallization from acetone-petroleum ether gives white crystals, melting point 174–175°, dec.;

$[\alpha]_D^{25} + 188°$ (1% in CHCl$_3$)

ultraviolet spectrum;

$\lambda_{max.}^{MeOH}$ 240 m$\mu$ ($\epsilon$ 24,500)

infrared spectrum;

$\lambda_{max.}^{KBr}$ 1760, 1690, 1640, 1625, 1595, 1220 cm.$^{-1}$

*Example V*

A mixture of 2 g. of 21-acetoxy-2α-bromo-4,9(11),16-pregnatriene-3,20-dione (IV, R′=acetyl) and 10 ml. of α-collidine is stirred at 155° in an oil bath for two and one-half hours, solution being complete on warming. The cooled mixture is diluted with 100 ml. of ether and filtered from collidine hydrobromide (1.06 g.). The filtrate, washed with 8% sulfuric acid, then with water, is dried with magnesium sulfate and evaporated to dryness under reduced pressure leaving 950 mg. (58%) of a glass. Crystallization from ether gives 757 mg. (46%) of 21-acetoxy-1,4,9(11),16-pregnatetraene-3,20-dione (V, R′=acetyl), melting point 164–167°. Recrystallization from acetone-petroleum ether (boiling point 60–70°) gives white crystals, melting point 171–173°;

$[\alpha]_D^{25} + 114°$ (1% in CHCl$_3$)

ultraviolet spectrum:

$\lambda_{max.}^{MeOH}$ 238 (24,000)

infrared spectrum:

$\gamma_{max.}^{KBr}$ 1750, 1680, 1630, 1610, 1580, 1240 cm.$^{-1}$

*Example VI*

To a stirred solution of 500 mg. of 21-acetoxy-1,4,9(11),16-pregnatetraene-3,20-dione (V, R′=acetyl) in 17.5 cc. of reagent acetone containing 0.15 cc. of acetic acid, cooled in an ice-bath, is added a solution of 236 mg. of potassium permanganate in 12.5 cc. of 85% aqueous acetone. After three minutes, 2 cc. of 10% aqueous sodium bisulfite solution is added. The solution is filtered from salts and then concentrated to dryness to remove acetone. The residual mixture is diluted with 5 cc. of water and extracted with two 10 cc. portions of methylene chloride. The combined extracts, washed with aqueous sodium bicarbonate and dried with magnesium sulfate are evaporated to dryness leaving 464 mg. (85%) of a glass. Crystallization from acetone-petroleum ether gives 244 mg. (45%) of product, 21-acetoxy-16α,17α-dihydroxy-1,4,9(11)-pregnatriene-3,20-dione, melting point 202–205°. Recrystallization from the same solvents gives white crystals, melting point 213–215°, $[\alpha]^{25}_D + 3.9°$ ($\pm 1°$) (1% in MeOH), $\lambda_{max.}^{MeOH}$ 238 ($\epsilon$ 16,400)

$\gamma_{max.}^{KBr}$ 1750, 1660, 1610, 1230 cm.$^{-1}$

The infrared spectrum was identical with that of an authentic sample.

Acetylation by the usual procedure with acetic anhydride in pyridine solution gives 16α,21-diacetoxy-17α-hydroxy-1,4,9(11)-pregnatriene-3,20-dione. Conversion of this latter compound of triamcinolone is described by S. Bernstein et al., J. Am. Chem. Soc., 81, 1689 (1959).

We claim:

1. A compound having the formula:

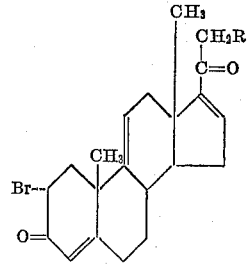

in which R is a member of the group consisting of bromine and lower alkanoyloxy radicals.

2. The compound 2α,21-dibromo-4,9(11),16-pregnatriene-3,20-dione.

3. The compound 21-acetoxy-2α-bromo-4,9(11),16-pregnatriene-3,20-dione.

No references cited.

UNITED STATES PATENT OFFICE
CERTIFICATION OF CORRECTION

Patent No. 2,998,433                          August 29, 1961

Robert E. Schaub et al.

It is hereby certified that error appears in the above numbered patent requiring correction and that the said Letters Patent should read as corrected below.

Column 2, formula II should appear as shown below instead of as in the patent:

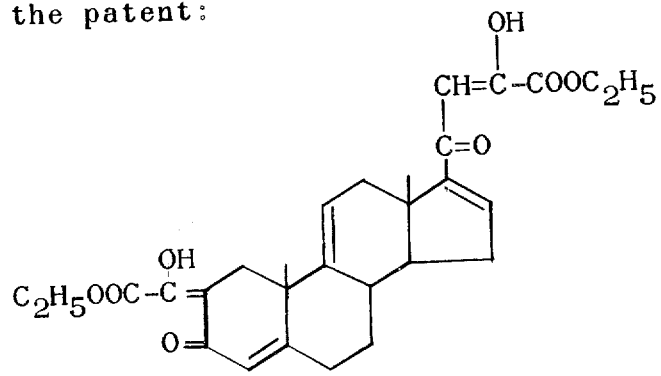

column 5, line 39, for $\lambda_{max.}^{KBr}$ read $\Upsilon_{max.}^{KBr}$ column 6, line 35, for "of" read -- to --.

Signed and sealed this 17th day of April 1962.

(SEAL)
Attest:

ESTON G. JOHNSON
Attesting Officer

DAVID L. LADD
Commissioner of Patents